US008531827B2

(12) United States Patent
Huang et al.

(10) Patent No.: US 8,531,827 B2
(45) Date of Patent: Sep. 10, 2013

(54) ELECTRONIC DEVICE AND KEYBOARD MODULE THEREOF

(75) Inventors: Chien-Hsin Huang, Taoyuan County (TW); Chang-Hwang Chiou, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 263 days.

(21) Appl. No.: 12/503,142

(22) Filed: Jul. 15, 2009

(65) Prior Publication Data

US 2010/0014235 A1 Jan. 21, 2010

(30) Foreign Application Priority Data

Jul. 16, 2008 (TW) ................................ 97126932 A

(51) Int. Cl.
*G06F 1/16* (2006.01)
*H05K 5/00* (2006.01)
*H05K 7/00* (2006.01)

(52) U.S. Cl.
USPC .................................. 361/679.29; 361/679.26

(58) Field of Classification Search
USPC ............. 361/679.08, 679.09, 679.17, 679.19, 361/679.55, 679.29, 679.3
See application file for complete search history.

(56) References Cited

U.S. PATENT DOCUMENTS

| | | | | |
|---|---|---|---|---|
| 4,528,597 A * | 7/1985 | Klein et al. | .................... | 348/838 |
| 5,144,290 A * | 9/1992 | Honda et al. | .................. | 345/156 |
| 5,253,139 A * | 10/1993 | Satou | ....................... | 361/679.09 |
| 5,264,992 A * | 11/1993 | Hogdahl et al. | ......... | 361/679.17 |
| 5,319,582 A | 6/1994 | Ma | | |
| D349,694 S * | 8/1994 | Takimoto | ..................... | D14/321 |
| D358,583 S * | 5/1995 | Winkler | ...................... | D14/324 |
| 5,708,561 A * | 1/1998 | Huilgol et al. | ........... | 361/679.07 |
| 5,796,576 A * | 8/1998 | Kim | ........................ | 361/679.28 |
| 5,844,543 A * | 12/1998 | Tamura et al. | ................ | 345/156 |
| D413,583 S * | 9/1999 | Lin | .............................. | D14/321 |
| 6,006,243 A * | 12/1999 | Karidis | ......................... | 708/100 |
| 6,137,468 A * | 10/2000 | Martinez et al. | .............. | 345/649 |
| 6,445,385 B1 * | 9/2002 | Shin et al. | ..................... | 345/204 |
| 6,498,721 B1 * | 12/2002 | Kim | ........................ | 361/679.06 |
| 6,512,670 B1 * | 1/2003 | Boehme et al. | ........... | 361/679.29 |
| 6,522,529 B1 * | 2/2003 | Huilgol et al. | ........... | 361/679.06 |
| 6,580,948 B2 * | 6/2003 | Haupert et al. | ................. | 607/60 |
| 6,590,547 B2 * | 7/2003 | Moriconi et al. | ............... | 345/30 |
| 6,687,518 B1 * | 2/2004 | Park | ............................ | 455/575.1 |
| 6,695,620 B1 * | 2/2004 | Huang | ............................ | 439/11 |
| 6,778,382 B2 * | 8/2004 | Yim | ........................ | 361/679.21 |
| 6,781,823 B1 * | 8/2004 | Nyack | ....................... | 361/679.29 |

(Continued)

FOREIGN PATENT DOCUMENTS

| | | |
|---|---|---|
| CN | 1536582 A | 10/2004 |
| CN | 2843007 Y | 11/2006 |

(Continued)

*Primary Examiner* — Adrian S Wilson
(74) *Attorney, Agent, or Firm* — Birch, Stewart, Kolasch & Birch, LLP

(57) ABSTRACT

An electronic device is provided, and includes a keyboard module and a display module. The keyboard module includes a first key area, a second key area, and a joining area disposed between the first key area and the second key area. The display module has a connecting surface detachably disposed on the joining area and electrical connected to the keyboard module. The display module is stood on the keyboard module to face a first direction in a first operation mode and a second direction is opposite to the first direction in a second operation mode.

16 Claims, 4 Drawing Sheets

(56) References Cited

U.S. PATENT DOCUMENTS

| | | | |
|---|---|---|---|
| 6,813,143 B2* | 11/2004 | Makela | 361/679.08 |
| 6,954,352 B2* | 10/2005 | Kuo | 361/679.27 |
| 6,989,987 B1* | 1/2006 | Wilson et al. | 361/679.02 |
| D519,116 S * | 4/2006 | Tanaka et al. | D14/341 |
| 7,130,669 B2* | 10/2006 | Moon | 455/575.3 |
| 7,298,610 B2* | 11/2007 | Kim et al. | 361/679.55 |
| 7,333,321 B2* | 2/2008 | Sutton et al. | 361/679.09 |
| 7,336,979 B2* | 2/2008 | Soejima | 455/575.1 |
| 7,379,292 B2* | 5/2008 | Tsai et al. | 361/679.27 |
| D584,304 S | 1/2009 | Lin | |
| 7,541,907 B2 | 6/2009 | Wang et al. | |
| 7,641,477 B2* | 1/2010 | DiFonzo et al. | 439/39 |
| 7,663,602 B2* | 2/2010 | Jones et al. | 345/168 |
| 7,884,803 B2* | 2/2011 | Huang | 345/169 |
| 2001/0022719 A1* | 9/2001 | Armitage et al. | 361/681 |
| 2002/0154475 A1* | 10/2002 | Lammintaus et al. | 361/683 |
| 2004/0185922 A1* | 9/2004 | Sutton et al. | 455/575.1 |
| 2004/0190234 A1* | 9/2004 | Lin et al. | 361/681 |
| 2005/0017953 A1* | 1/2005 | Pekka | 345/169 |
| 2005/0057893 A1* | 3/2005 | Homer et al. | 361/683 |
| 2006/0002072 A1* | 1/2006 | Sutton et al. | 361/683 |
| 2006/0012563 A1 | 1/2006 | Fyke et al. | |
| 2006/0067036 A1* | 3/2006 | Lin et al. | 361/681 |
| 2006/0165110 A1* | 7/2006 | Magendanz et al. | 370/419 |
| 2006/0203437 A1* | 9/2006 | Lev et al. | 361/681 |
| 2007/0103266 A1* | 5/2007 | Wang et al. | 335/285 |
| 2007/0105606 A1* | 5/2007 | Yoon et al. | 455/575.4 |
| 2008/0068781 A1* | 3/2008 | Kim | 361/600 |
| 2008/0081505 A1* | 4/2008 | Ou et al. | 439/374 |
| 2008/0125191 A1* | 5/2008 | Nordenskjold | 455/575.1 |
| 2008/0174942 A1* | 7/2008 | Yang et al. | 361/680 |
| 2009/0141439 A1* | 6/2009 | Moser | 361/679.29 |
| 2009/0143100 A1* | 6/2009 | Champion | 455/556.2 |

FOREIGN PATENT DOCUMENTS

| | | |
|---|---|---|
| TW | I248017 | 1/2006 |
| TW | I258654 | 7/2006 |
| WO | WO 2007/055750 A2 | 5/2007 |

* cited by examiner

ELECTRONIC DEVICE AND KEYBOARD MODULE THEREOF

CROSS REFERENCE TO RELATED APPLICATIONS

This Application claims priority of Taiwan Patent Application No. 97126932, filed on Jul. 16, 2008, the entirety of which is incorporated by reference herein.

BACKGROUND OF THE INVENTION

1. Field of the Invention

The present invention relates to an electronic device, and in particular relates to an electronic device provided with QWERTY keys and multimedia keys.

2. Description of the Related Art

Nowadays, large and small electronic devices such as personal computers, MP3 players, digital cameras, mobile phones and personal digital assistants (PDAs), have become a necessity for life in developed countries. As such, key pads or keyboards thereof have been developed to control a variety of interfaces applicable to today's electronic devices. Thus, users can conveniently control the electronic devices by key pads or keyboards thereof, offering a multitude of functionalities.

For conventional electronic devices, monitor modules and keyboard modules are generally combined by a slidably pivotal axis or rotatably pivotal axis. To attain a light, thin and small-sized electronic device, all modules of the electronic device are generally designed separately, thus reducing available space of the keyboard module on the electronic device. Accordingly, operation of the electronic device is made more difficult and inconvenient (e.g. locating multimedia function key(s)), following more complicated and non-ergonomic key arrangements of the conventional key pad or keyboard.

BRIEF SUMMARY OF THE INVENTION

The present invention provides an electronic device including a keyboard module and a display module. The keyboard module comprises a first key area, a second key area, and a joining area disposed between the first key area and the second key area. The display module comprises a connecting surface detachably disposed on the joining area and electrically connected to the keyboard module, wherein the display module is stood on the keyboard module in a first direction in a first operation mode and a second direction opposite to the first direction in a second operation mode.

The prevent invention further provides a keyboard module adapted for combining to a display module provided with a connecting surface. The keyboard module comprises a first key area, a second key area and a joining area disposed between the first key area and the second key area. The connecting surface of the display module is detachably disposed on the joining area and electrically connected to the keyboard module, wherein the display module is stood the keyboard module in a first direction in a first operation mode and a second direction opposite to the first direction in a second operation mode.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
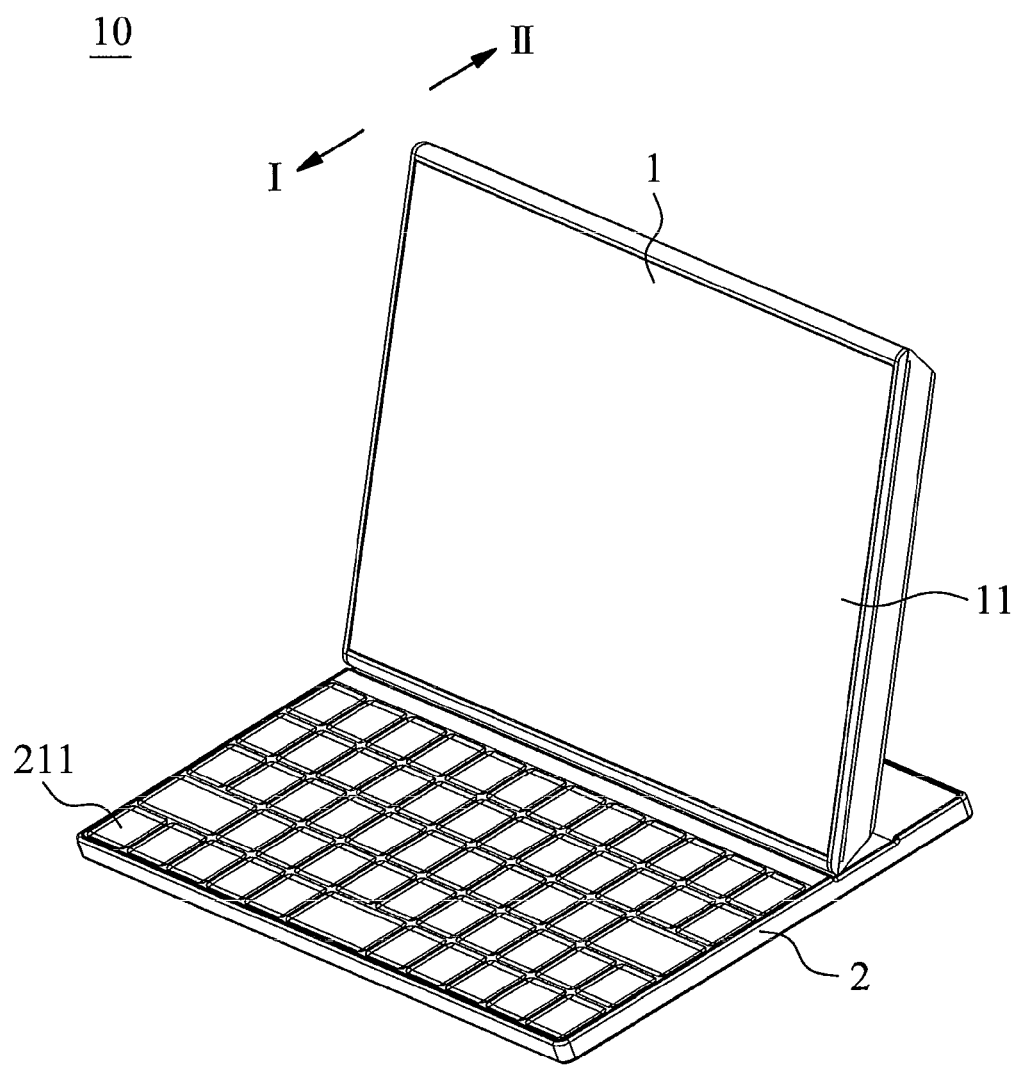
FIG. 1 shows a first operation mode of an electronic device according to an embodiment of the present invention.
Figure 2:
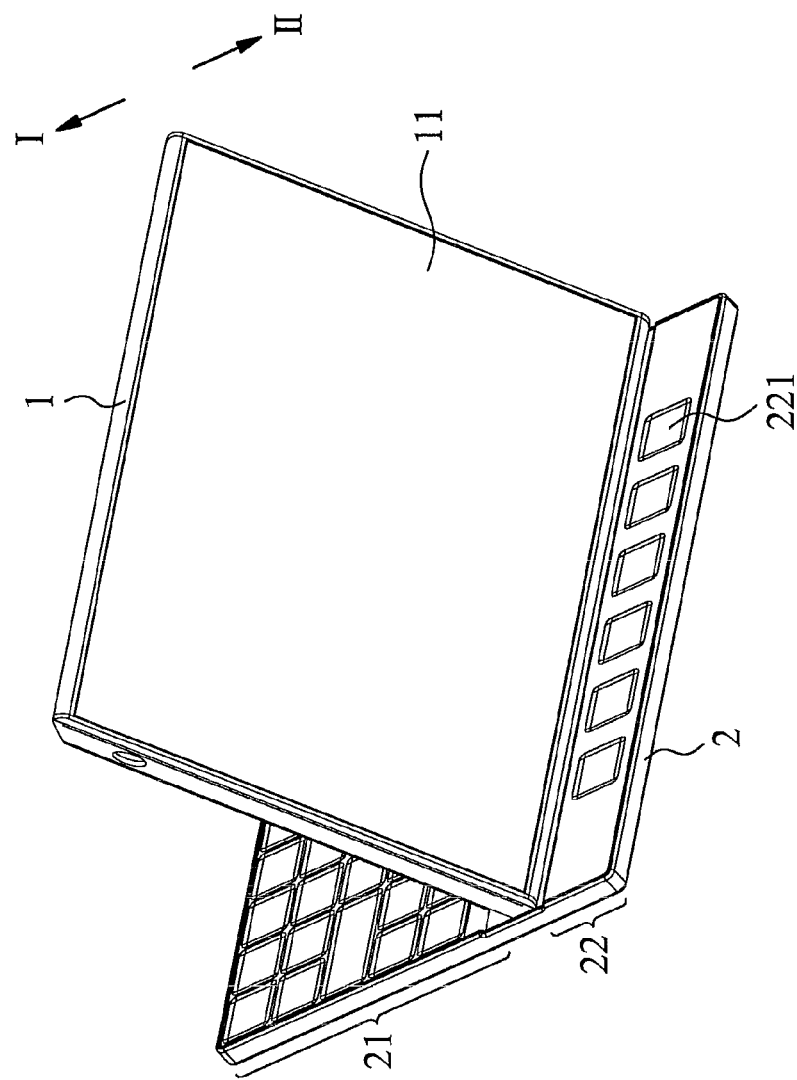
FIG. 2 shows a second operation mode of an electronic device according to an embodiment of the present invention.

Referring to FIGS. 1 and 2, an electronic device 10 according to an embodiment of the present invention operable between a first operation mode (as shown in FIG. 1) and a second operation mode (as shown in FIG. 2) comprises a display module 1 and a keyboard module 2. The display module 1 has a display surface 11, a second connector 12, a plurality of second fixed structures 13 and a connecting surface 14. The keyboard module 2 comprises a plurality of QWERTY keys 211 and a plurality of multimedia keys 221.

When the electronic device 10 is operated in the first operation mode in FIG. 1, a user can see the display surface 11 of the display module 1 and operate the plurality of QWERTY keys 211 of the keyboard module 2, while the plurality of multimedia keys 221 of the keyboard module 2 are hidden behind and by the display module 1.

When the electronic device 10 is turned to the second operation mode, as shown in FIG. 2, i.e., when the display module 1 separated from the keyboard module 2 by the user is rotated 180 degrees to be installed on the keyboard module 2, the user can see the display surface 11 of the display module 1 and simultaneously operate the plurality of multimedia keys 221 of the keyboard module 2, while the plurality of QWERTY keys 211 are still hidden behind and by the display module 1.

In this embodiment, the electronic device 10 can be a mobile phone, a personal digital assistant (PDA), an ultra mobile personal computer (UMPC) or other portable electronic devices. A detailed description of the structure of the electronic device 10 is given as follow.

Figure 3:
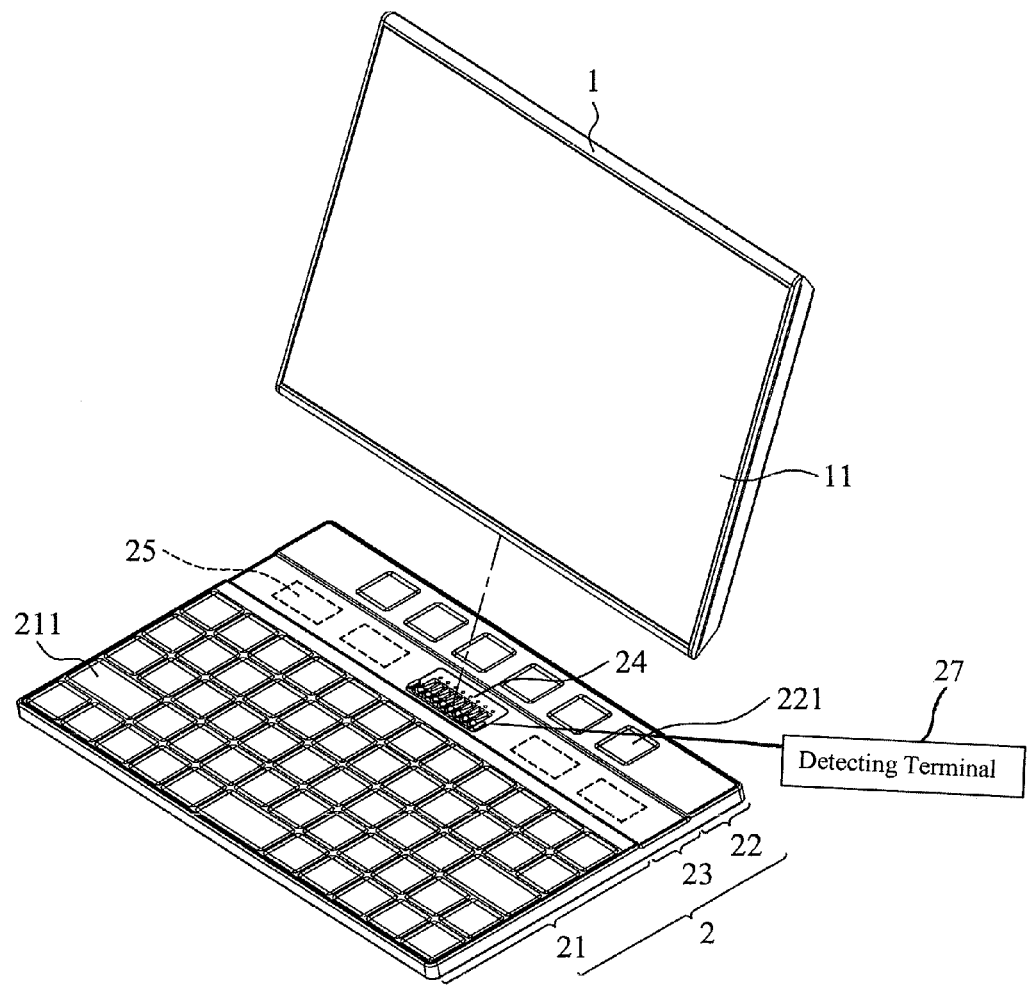
FIG. 3 is a schematic view showing an electronic device according to an embodiment of the present invention.
Figure 4:
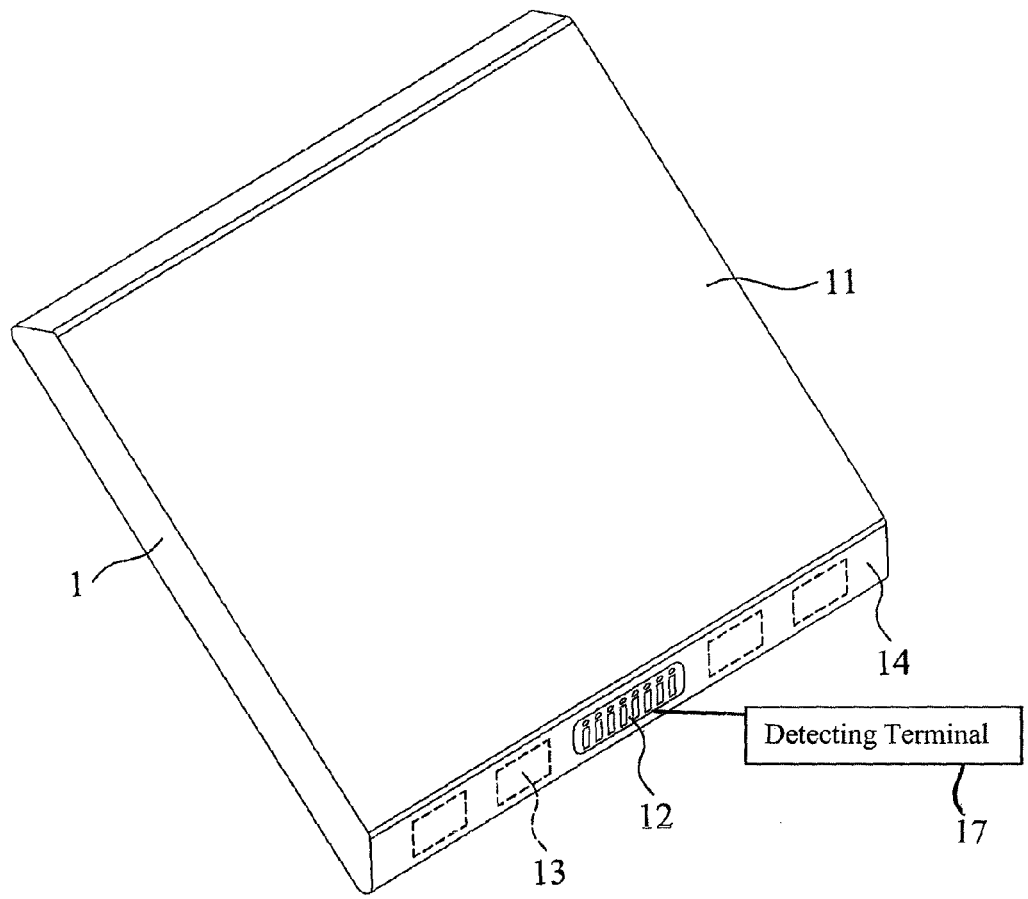
FIG. 4 is a schematic view showing a display module of the electronic device according to an embodiment of the present invention.

In FIGS. 3 and 4, the keyboard module 2 comprises a first key area 21, a plurality of QWERTY keys 211 disposed in the first key area 21, a second key area 22, a plurality of multimedia keys 221 disposed on the second key area 22, a joining area 23 disposed between the first key area 21 and the second key area 22, a first connector 24 disposed at a central part of the joining area 23, and a first fixed structure 25 disposed around both sides of the first connector 24.

The connecting surface 14 of the display module 1 is detachably disposed on the joining area 23 and electrically connected to the keyboard module 2. The display surface 11 of the display module 1 is stood on the keyboard module 2 to face a first direction I (shown in FIG. 1) in the first operation mode and a second direction II (shown in FIG. 2) opposite to the first direction I in the second operation mode. In this embodiment, the second connector 12 is disposed on the connecting surface 14, and the plurality of second fixed structures 13 are disposed around both sides of the second connector 12.

When the display module 1 is stood on the joining area 23 of the keyboard module 2, the first connector 24 is electrically connected to the second connector 12 and the first fixed structure 25 is coupled to the plurality of second fixed structures 13, thereby fixing the display module 1 on the joining area 23 of the keyboard module 2.

In this embodiment, the first fixed structure 25 of the keyboard module 2 and the plurality of second fixed structures 13 of the display module 1 can be magnetic elements. In other embodiments, the first fixed structure 25 of the keyboard module 2 and the plurality of second fixed structures 13 of the display module 1 can be hooks, latches or other fastening elements for fixing the display module 1 to the joining area 23 of the keyboard module 2.

In addition, referring to FIGS. 3 and 4, two detecting terminals 17 and 27 are respectively provided by the first connector 24 of the keyboard module 2 and the second connector 12 of the display module 1. When the first connector 24 of the keyboard module 2 and the second connector 12 of the display module 1 are different connections (e.g., in the first operation mode or in the second operation mode, the detecting terminals are therefore located at different positions (e.g., located at the leftmost or rightmost side of the inner of the first connector 24 and the second connector 12), thereby determining the electronic device 10 being situated in the first operation mode or the second mode. In other embodiments, without the installation of the first connector 24 and the second connector 12, the display module 1 and the keyboard module 2 can still be electrically connected to each other by wireless means (e.g., Bluetooth).

In summary, based on the electronic device 10 of the embodiment, it is noted that the keyboard module 2 is an assembly of the first key area 21, the second key area 22 and the joining area 23, the display module 1 and the keyboard module 2 may be separated, the QWERTY keys 211 and the multimedia keys 221 can be simultaneously or selectively operated according to user requirements, and the functions of the electronic device 10 can be executed by the more simplified key design, to facilitate operation of the electronic device 10.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a keyboard module, comprising a first key area, a second key area, a joining area disposed between the first key area and the second key area, and a first connector disposed in the joining area; and
   a display module, comprising a connecting surface detachably disposed on the joining area and a second connector disposed on the connection surface for electrically connecting the first connector, wherein the display module is supported on the keyboard module facing toward a first direction when in a first operation mode, and the display module is supported on the keyboard module facing toward a second direction opposite to the first direction when in a second operation mode,
   wherein the display and keyboard modules are in different electrical connections, the first and second connectors are provided with detecting terminals, and the first and second connectors form two different physical circuit configurations corresponding to the first and second operation modes, respectively, and wherein connections of the detecting terminals are physically different in the two different physical circuit configurations in order to determine which of the first and second operation modes is selected to operate.

2. The electronic device as claimed in claim 1, wherein the first connector includes a first detecting terminal, the second connector includes a second detecting terminal, and the first and second detecting terminals are configured to form two connections in the first operation mode and the second operation mode, respectively, said two connections being in two difference positions with respect to the first and second connectors to correspond to different operation modes.

3. The electronic device as claimed in claim 1, wherein the display module and the keyboard module are electrically connected to each other by wireless means.

4. The electronic device as claimed in claim 1, wherein the keyboard module further comprises a first fixed structure and the display module further comprises a second fixed structure, and the display module is fixed to the joining area of the keyboard module by the first fixed structure and the second fixed structure when the display module is supported on the joining area of the keyboard module.

5. The electronic device as claimed in claim 4, wherein the first fixed structure of the keyboard module and the second fixed structure of the display module comprise magnetic elements.

6. The electronic device as claimed in claim 1, wherein the keyboard module further comprises a plurality of QWERTY keys disposed on the first key area and a plurality of multimedia keys disposed on the second key area.

7. A keyboard module adapted for combining to a display module provided with a connecting surface and a second connector on the connecting surface, comprising:
   a first key area;
   a second key area;
   a joining area disposed between the first key area and the second key area; and
   a first connector, disposed in the joining area for electrically connecting the second connector of the display module, wherein the connecting surface of the display module is detachably disposed on the joining area, the display module is supported on the keyboard module facing toward a first direction when in a first operation mode, and the display module is supported on the keyboard module facing toward a second direction opposite to the first direction when in a second operation mode,
   wherein the display and keyboard modules are in different electrical connections, the first and second connectors are provided with detecting terminals, and the first and second connectors form two different physical circuit configurations corresponding to the first and second operation modes, respectively, and wherein connections of the detecting terminals are physically different in the two different physical circuit configurations in order to determine which of the first and second operation modes is selected to operate.

8. The keyboard module as claimed in claim 7 wherein the first connector includes a first detecting terminal, the second connector includes a second detecting terminal, and the first and second detecting terminals are configured to form two connections in the first operation mode and the second operation mode, respectively, said two connections being in two difference positions with respect to the first and second connectors to correspond to different operation modes.

9. The keyboard module as claimed in claim 7, wherein the display module and the keyboard module are electrically connected to each other by wireless means.

10. The keyboard module as claimed in claim 7 further comprising a first fixed structure and the display module further comprising a second fixed structure, wherein the display module is fixed to the joining area of the keyboard module by the first fixed structure and the second fixed structure when the display module is supported on the joining area of the keyboard module.

11. The keyboard module as claimed in claim 10, wherein the first fixed structure of the keyboard module and the second fixed structure of the display module comprise magnetic elements.

12. The keyboard module as claimed in claim 7 further comprising a plurality of QWERTY keys disposed on the first key area and a plurality of multimedia keys disposed on the second key area.

13. The electronic device as claimed in claim 1, wherein the display module is configured to be completely detached from the keyboard module without any physical connection, then rotated 180 degree and attached back to the keyboard module so as to switch from the first operation mode to the second operation mode.

14. The keyboard module as claimed in claim 7, wherein the display module is configured to be completely detached from the keyboard module without any physical connection, then rotated 180 degree and attached back to the keyboard module so as to switch from the first operation mode to the second operation mode.

15. The electronic device as claimed in claim 1, wherein the first operation mode is different from the second operation mode, and keys in the first key area are configured to operate in the first operation mode, and keys in the second key area are configured to operate in the second operation mode.

16. The keyboard module as claimed in claim 7, wherein the first operation mode is different from the second operation mode, and keys in the first key area are configured to operate in the first operation mode, and keys in the second key area are configured to operate in the second operation mode.

* * * * *